(12) United States Patent
Dannat et al.

(10) Patent No.: US 11,443,626 B2
(45) Date of Patent: *Sep. 13, 2022

(54) ADJUSTING VEHICLE TIMING IN A TRANSPORTATION NETWORK

(71) Applicant: Quartz Auto Technologies LLC, Baltimore, MD (US)

(72) Inventors: Tobias Dannat, Zurich (CH); Andreas Kuehmichel, Mainz (DE); Tim Scheideler, Helsinki (FI); Matthias Seul, Kassel (DE); Thomas Allen Snellgrove, Littleton, MA (US)

(73) Assignee: Quartz Auto Technologies LLC, Baltimore, MD (US)

(*) Notice: Subject to any disclaimer, the term of this patent is extended or adjusted under 35 U.S.C. 154(b) by 151 days.

This patent is subject to a terminal disclaimer.

(21) Appl. No.: 16/913,909

(22) Filed: Jun. 26, 2020

(65) Prior Publication Data

US 2021/0012659 A1    Jan. 14, 2021

Related U.S. Application Data

(63) Continuation of application No. 16/019,920, filed on Jun. 27, 2018, now Pat. No. 10,733,888, which is a continuation of application No. 15/582,909, filed on May 1, 2017, now Pat. No. 10,083,609, which is a continuation of application No. 14/934,684, filed on Nov. 6, 2015, now Pat. No. 9,691,275.

(51) Int. Cl.
| | |
|---|---|
| *G08G 1/123* | (2006.01) |
| *B60K 35/00* | (2006.01) |
| *G06Q 10/04* | (2012.01) |
| *G06Q 50/30* | (2012.01) |
| *G08G 1/00* | (2006.01) |
| *G01C 21/34* | (2006.01) |

(52) U.S. Cl.
CPC ............ *G08G 1/123* (2013.01); *B60K 35/00* (2013.01); *G01C 21/3492* (2013.01); *G06Q 10/047* (2013.01); *G06Q 50/30* (2013.01); *G08G 1/00* (2013.01); *G08G 1/20* (2013.01)

(58) Field of Classification Search
CPC .......... G08G 1/00; G08G 9/00; G08G 1/0962; G08G 1/0116; G08G 1/096716; G08G 1/04; G08G 1/123; G08G 1/0968; G08G 1/20; B61L 27/0016; G06Q 10/06311; G06Q 50/30; G06Q 10/047; G06F 9/5011; G06F 19/00
See application file for complete search history.

(56) References Cited

U.S. PATENT DOCUMENTS

| | | | | |
|---|---|---|---|---|
| 8,825,350 | B1* | 9/2014 | Robinson | G08G 1/0116 340/909 |
| 9,691,275 | B2* | 6/2017 | Dannat | B60K 35/00 |
| 10,083,609 | B2* | 9/2018 | Dannat | G06Q 10/047 |
| 10,733,888 | B2* | 8/2020 | Dannat | G08G 1/123 |
| 2008/0094250 | A1* | 4/2008 | Myr | G08G 1/04 340/909 |

(Continued)

*Primary Examiner* — Yuri Kan
(74) *Attorney, Agent, or Firm* — Kinney & Lange, P.A.

(57) ABSTRACT

Methods, computer program products, and systems are presented. The methods include, for instance: obtaining passenger information of one or more passenger traveling within a transportation network; and providing one or more output based on a processing of the passenger information.

19 Claims, 22 Drawing Sheets

(56) References Cited

U.S. PATENT DOCUMENTS

| | | | |
|---|---|---|---|
| 2009/0077099 A1* | 3/2009 | Haustein | G06F 9/5011 |
| 2009/0174573 A1* | 7/2009 | Smith | G08G 1/0962 |
| | | | 340/905 |
| 2012/0221230 A1* | 8/2012 | Reilhac | G08G 1/096716 |
| | | | 701/117 |
| 2013/0116916 A1* | 5/2013 | Kickbusch | B61L 27/0016 |
| | | | 701/118 |
| 2014/0136025 A1* | 5/2014 | Cooper | G08G 9/00 |
| | | | 701/2 |
| 2015/0262101 A1* | 9/2015 | Aoki | G06Q 10/06311 |
| | | | 705/7.13 |

* cited by examiner

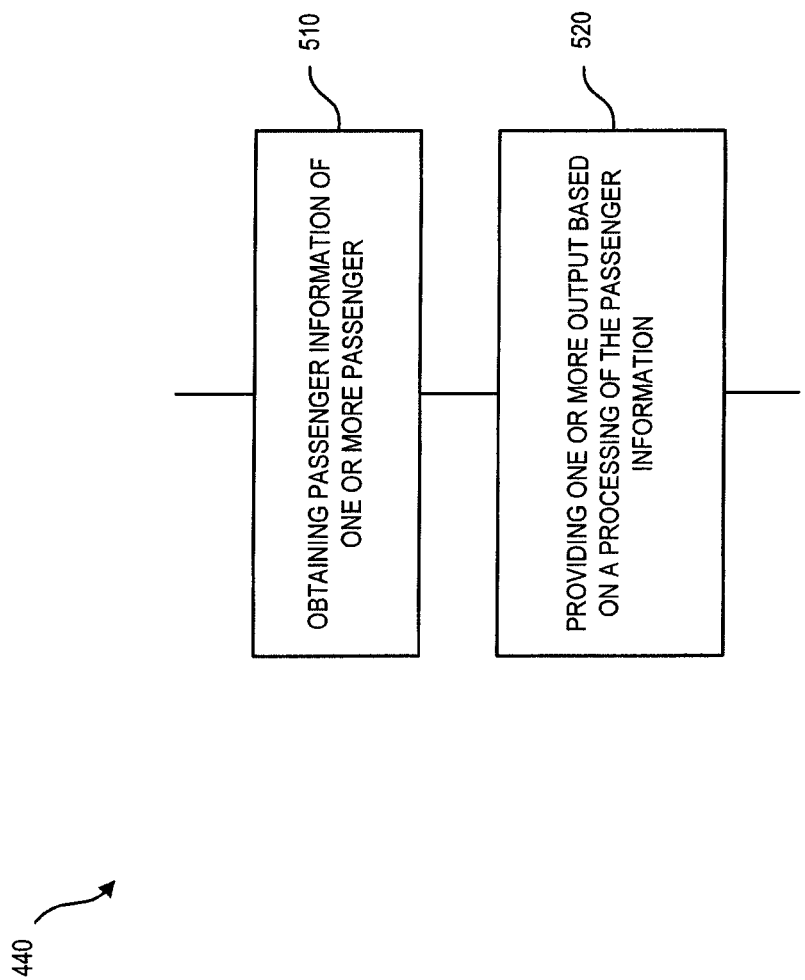

| Actual Flow | | | | | |
|---|---|---|---|---|---|
| FM₃ | | To | | | |
| | | -2 | -1 | 1 | 2 |
| From | -2 | | 40 | 40 | 100 |
| | -1 | 15 | 40 | 75 | 45 |
| | 1 | 40 | 15 | 15 | 10 |
| | 2 | 20 | | | |

*FIG. 10*

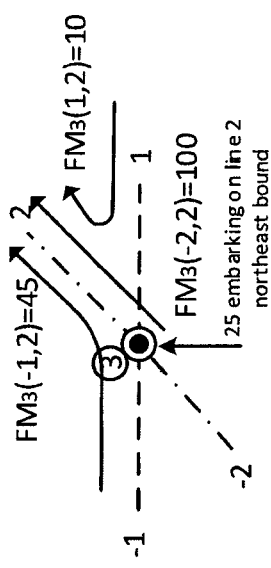

Actual Flow

| FM₄ | -2 | 2 | 11 |
|---|---|---|---|
| -2 | 20 | 140 | 30 |
| 2 | 150 | 25 | 5 |
| 11 | 25 | 5 | 5 |

From / To

FIG. 12A

Actual Flow

| FM₅ | -2 | 2 |
|---|---|---|
| -2 | 20 | 160 |
| 2 | 150 | 15 |

From / To

FIG. 12B

| Normalized Flow | | To | | | |
|---|---|---|---|---|---|
| | $FM_3^N$ | -2 | -1 | 1 | 2 |
| From | -2 | 3% | 8% | 8% | 20% |
| | -1 | 3% | 1% | 15% | 9% |
| | 1 | 8% | 8% | 0% | 2% |
| | 2 | 4% | 3% | 3% | 5% |

FIG. 13

| Station 3 | Line 1 eastbound | | Line 2 northbound | | Line 2 southbound | |
|---|---|---|---|---|---|---|
| | Arrival | Departure | Arrival | Departure | Arrival | Departure |
| | 09:42 | | 09:50 | 09:51 | 09:43 | 09:44 |
| | 09:52 | 9:43 | 10:00 | 10:01 | 09:54 | 09:55 |
| | | 09:53 | | | | |
| $T_3(j,k;t=09:42)$ | to k = 1 | | to k = 2 | | to k = -2 | |
| from j = -1 | 1 min. | | 9-3=6 min. | | 12-3=9 min. | |

FIG. 17A

| | Line 2 southwest bound j=2 | | Line 2 east bound j=-2 k=2 | | Line 11 north bound j=11 k=11 | |
|---|---|---|---|---|---|---|
| | k=-2 Arrival | Departure | Arrival | Departure | Arrival | Departure |
| | | | 07:31 | 07:32 | 07:30 | 07:36 |
| | 07:38 | 07:39 | | | | |
| | 08:08 | 08:09 | 08:01 | 08:02 | 08:00 | 08:06 |

FIG. 17B

Flow Matrix

| FM₄ | k (to) | | |
|---|---|---|---|
| j (from) | -2 | 2 | 11 |
| -2 | 20 | 140 | 30 |
| 2 | 150 | 25 | 5 |
| 11 | 25 | 5 | 5 |

FIG. 17C $T_4(j,k; t=07:20)$

| | k (to) | | |
|---|---|---|---|
| j (from) | -2 | 2 | 11 |
| -2 | 0 | 1 | 5-3=2 |
| 2 | 8-3=5 | 0 | 28-3=25 |
| 11 | 30-3=27 | | 0 |

FIG. 17D

Waiting time in passenger minutes

| | k (to) | | |
|---|---|---|---|
| j (from) | -2 | 2 | 11 |
| -2 | 0 | 140 | 60 |
| 2 | 150 | 0 | 125 |
| 11 | 125 | 135 | 0 |

Waiting time $WT_4(t=07:20)$ 735

FIG. 18A

| Line 2 southwest bound | | Line 2 east bound | | Line 11 north bound | |
|---|---|---|---|---|---|
| j = 2 | k = -2 | j = -2 | k = 2 | j = 11 | k = 11 |
| Arrival | Departure | Arrival | Departure | Arrival | Departure |
| 07:08 | 07:09 | 07:06 | 07:07 | 07:18 | 07:19 |
| 07:38 | 07:39 | 07:36 | 07:37 | 07:30 | 07:36 |
| 08:08 | 08:09 | 08:01 | 08:02 | 08:00 | 08:06 |

FIG. 18B

Flow Matrix

| $FM_4$ | k (to) | | |
|---|---|---|---|
| | -2 | 2 | 11 |
| j (from) -2 | | 20 | 30 |
| j (from) 2 | 150 | | 25 |
| j (from) 11 | 25 | 5 | 5 |

| | k (to) | | |
|---|---|---|---|
| | -2 | 2 | 11 |
| j (from) -2 | 0 | 1 | 30-3=27 |
| j (from) 2 | 1 | 5 | 28-3=25 |
| j (from) 11 | 8-3=5 | 30-3=27 | 0 |

FIG. 18D

Waiting time in passenger minutes

| | k (to) | | |
|---|---|---|---|
| | -2 | 2 | 11 |
| j (from) -2 | 0 | 140 | 810 |
| j (from) 2 | 150 | 125 | 125 |
| j (from) 11 | 125 | 135 | 0 |

Waiting time $WT_4(t=07:20)$ 1,610

FIG. 19A

| | Line 2 southwest bound | | Line 2 east bound | | Line 11 north bound | |
|---|---|---|---|---|---|---|
| j = 2 | k = -2 | | j = -2 | k = 2 | j = 11 | k = 11 |
| | Arrival | Departure | Arrival | Departure | Arrival | Departure |
| | | 07:39 | | 07:37 | 07:30 | 07:41 |
| | 07:38 | 08:09 | 07:36 | 08:02 | 08:00 | 08:06 |
| | 08:08 | | 08:01 | | | |

FIG. 19B

Flow Matrix

| $FM_4$ | | k (to) | |
|---|---|---|---|
| | -2 | 2 | 11 |
| j (from) -2 | | 20 | 30 |
| 2 | 150 | | 5 |
| 11 | 25 | 25 | 5 |

| | | k (to) | |
|---|---|---|---|
| | -2 | 2 | 11 |
| j (from) -2 | 0 | 1 | 5-3=2 |
| 2 | 1 | 5 | 28-3=25 |
| 11 | 8-3=5 | 30-3=27 | 5 |

FIG. 19D

Waiting time in passenger minutes

| | | k (to) | |
|---|---|---|---|
| | -2 | 2 | 11 |
| j (from) -2 | 0 | 140 | 60 |
| 2 | 150 | 125 | 125 |
| 11 | 125 | 135 | 25 |

Waiting time $WT_4(t=07:20)$    885

ADJUSTING VEHICLE TIMING IN A TRANSPORTATION NETWORK

CROSS-REFERENCE TO RELATED APPLICATIONS

This application is a continuation of U.S. application Ser. No. 16/019,920, filed Jun. 27, 2018, which is a continuation of U.S. Pat. No. 10,083,609, filed May 1, 2017, which is a continuation of U.S. Pat. No. 9,691,275, filed Nov. 6, 2015, which is incorporated by reference herein in its entirety.

TECHNICAL FIELD

The present disclosure relates to transportation network and particularly to adjusting vehicle departure times in a transportation network.

BACKGROUND

Transportation networks can include a variety of different types of transportation vehicles. Transportation networks can be provided e.g., by train transportation networks, bus transportation networks and plane transportation networks. A transportation network can include transportation lines and stations, e.g. one or more of non-interchange stations or interchange stations. There is often published a baseline transportation timetable for a transportation network. A baseline transportation timetable can specify departure times for vehicles in a transportation network.

SUMMARY

The shortcomings of the prior art are overcome, and additional advantages are provided, through the provision, in one aspect, of a method. The method can include, for example: obtaining passenger information of one or more passenger traveling within a transportation network, wherein the passenger information includes passenger location information; and providing one or more output based on a processing of the passenger information.

In another aspect, a computer program product can be provided. The computer program product can include a computer readable storage medium readable by one or more processor and storing instructions for execution by the one or more processor for performing a method. The method can include, for example: obtaining passenger information of one or more passenger traveling within a transportation network, wherein the passenger information includes passenger location information; and providing one or more output based on a processing of the passenger information.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining passenger information of one or more passenger traveling within a transportation network, wherein the passenger information includes passenger location information; and providing one or more output based on a processing of the passenger information.

Additional features and advantages are realized through the techniques set forth herein. Other embodiments and aspects are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 5 is a flow diagram illustrating a method in accordance with an embodiment as set forth herein;

FIG. 10 is a passenger flow matrix in accordance with an embodiment as set forth herein;

FIG. 11A is a passenger flow matrix in accordance with an embodiment as set forth herein;

FIG. 11B is a diagram illustrating passenger flow in accordance with an embodiment as set forth herein;

FIG. 12A is a passenger flow matrix in accordance with an embodiment as set forth herein;

FIG. 12B is a passenger flow matrix in accordance with an embodiment as set forth herein;

FIG. 13 is a passenger flow matrix in accordance with an embodiment as set forth herein;

FIG. 17A is a timetable in accordance with an embodiment as set forth herein;

FIG. 17B is a passenger flow matrix in accordance with an embodiment as set forth herein;

FIG. 17C is a passenger flow matrix in accordance with an embodiment as set forth herein;

FIG. 17D is a passenger flow matrix in accordance with an embodiment as set forth herein;

FIG. 18A is a timetable in accordance with an embodiment as set forth herein;

FIG. 18B is a passenger flow matrix in accordance with an embodiment as set forth herein;

FIG. 18C is a passenger flow matrix in accordance with an embodiment as set forth herein;

FIG. 18D is a passenger flow matrix in accordance with an embodiment as set forth herein;

FIG. 19A is a timetable in accordance with an embodiment as set forth herein;

FIG. 19B is a passenger flow matrix in accordance with an embodiment as set forth herein;

FIG. 19C is a passenger flow matrix in accordance with an embodiment as set forth herein;

FIG. 19D is a passenger flow matrix in accordance with an embodiment as set forth herein;

DETAILED DESCRIPTION

Figure 1:
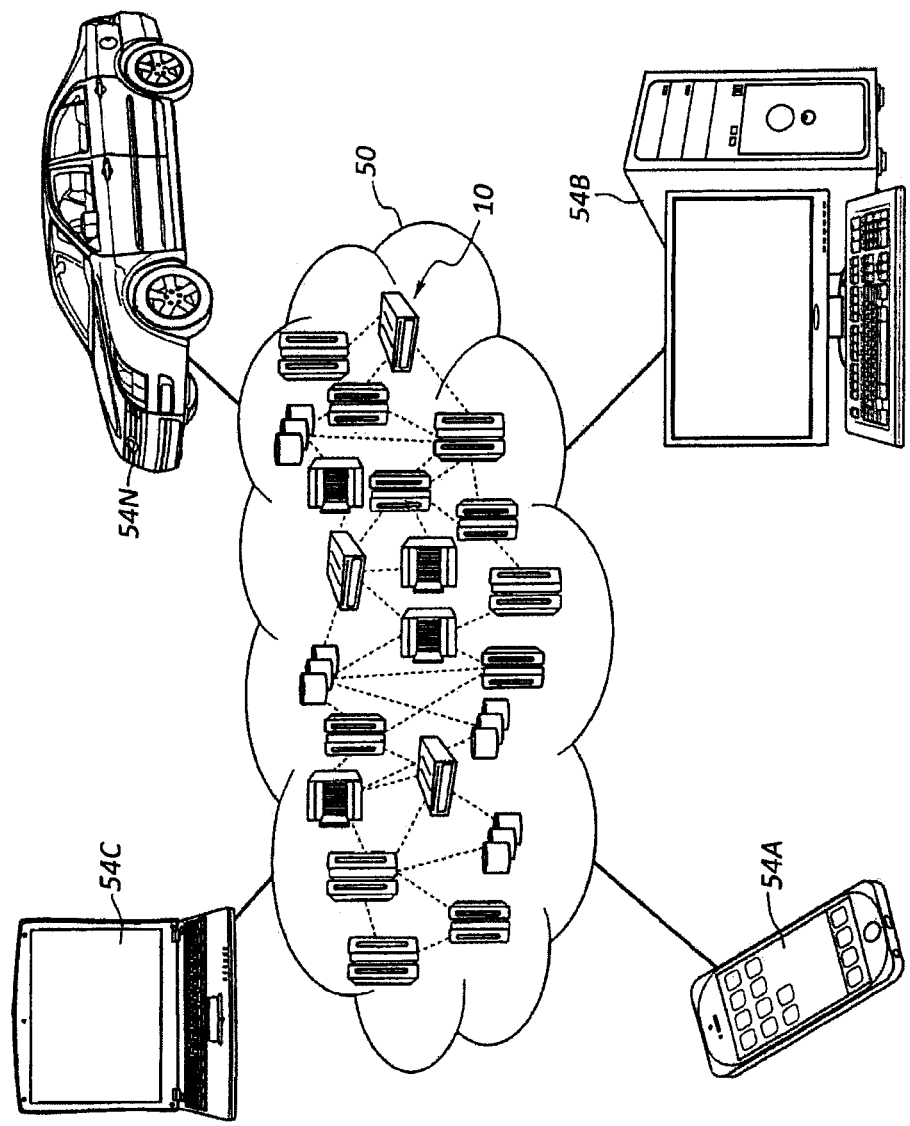
FIG. 1 depicts a cloud computing environment according to an embodiment as set forth herein.

Aspects of the present disclosure and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the disclosure in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

The present disclosure provides, in part, methods, computer program products, and systems for adjusting vehicle timing in a transportation network.

Advantageously, the techniques disclosed herein allow for optimization of vehicle and/or passenger flow in a transportation network. Embodiments herein recognize that vehicle and/or passenger flow is often not optimized in a transportation network. Techniques herein can be useful e.g. in reducing a cumulative wait time of passengers of a transportation network. Techniques set forth herein can be useful e.g. in determining unwanted passenger congestion in a transportation network and in relieving unwanted passenger congestion in a transportation network. In one embodiment passenger congestion can be addressed contemporaneously with determining of a current congestion condition.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
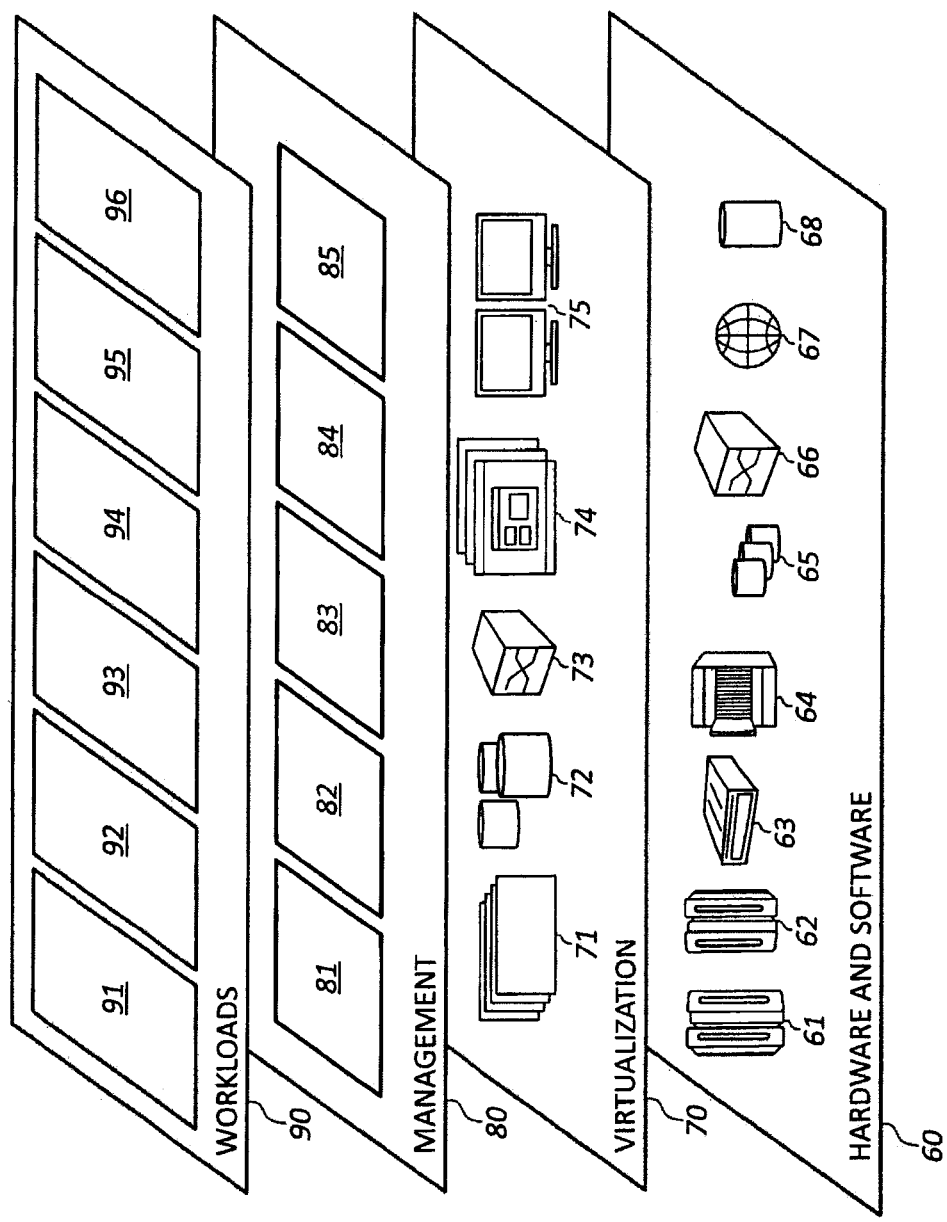
FIG. 2 depicts abstraction model layers according to an embodiment as set forth herein.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and transportation network timing processing 96.

Figure 3:
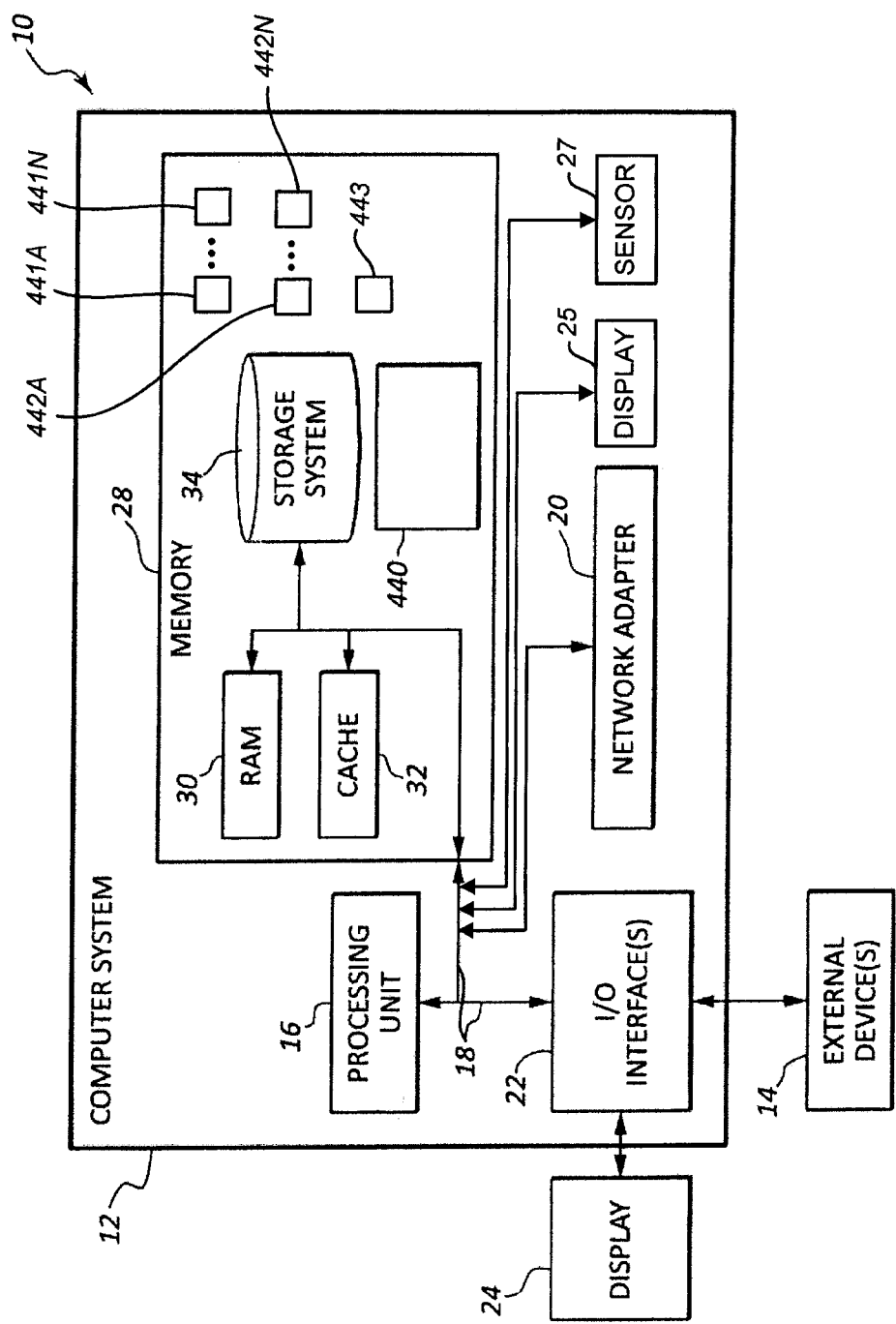
FIG. 3 depicts a hardware overview of a computing node, in accordance with an embodiment as set forth herein.

Referring now to FIG. 3, a schematic of an example of a computing node is shown. Computing node 100 is only one example of a suitable computing node and is not intended to suggest any limitation as to the scope of use or functionality of embodiments of the invention described herein. Regardless, computing node 100 is capable of being implemented and/or performing any of the functionality set forth hereinabove.

In one embodiment, computing node 100 can be provided as a cloud computing node 10 of a cloud computing environment 50. In one embodiment, computing node 100 can be provided as a computing node of a computing environment other than a cloud computing environment.

In computing node 100 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system 12 in computing node 100 is shown in the form of a general-purpose computing device. The components of computer system 12 may include, but are not limited to, one or more processor 16, a system memory 28, and a bus 18 that couples various system components including system memory 28 to one or more processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, nonvolatile optical disk such as a CD-ROM, DVD-ROM or other optical media can be provided. In such instances, each can be connected to bus 18 by one or more data media interfaces. As will be further depicted and described below, memory 28 may include at least one or more program (e.g., one or more program 440 and/or one or more program 40A-40N as set forth herein) configured to carry out the functions of embodiments of the invention.

One or more program 440, having a set (at least one) of program modules, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. In place of or in addition to one or more program 440, memory 28 can store one or more additional one or more program, e.g., one or more program 441A-441N, 442A-442N, 443.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device vehicle operators, redundant processing units, external disk drive arrays, RAID systems, tape drives, and data archival storage systems, etc. In addition to or in place of having external devices 14 and display 24, which can be configured to provide user interface functionality, computer system 12 of computing node 100 in one embodiment can include and display 25 connected to bus 18. Display 25 can be configured as a touch screen display and can be configured to provide user interface functionality. Computer system in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 100.

A representative one or more program of one or more program 440, 441A-441N, 442A-442N, 443 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 (and optionally at least one program of one or more program 441A-441N, 442A-442N, 443) can generally carry out the functions and/or methodologies of embodiments of the invention as described herein. One or more program 440 (and optionally at least one program of one or more program 441A-441N, 442A-442N, 443) can include computer readable program instructions as are set forth herein that can be stored in a computer readable storage medium within a respective computing/processing device. In one embodiment a computer readable storage medium as set forth herein can be included in memory 28 as set forth in FIG. 3.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures for example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4A:
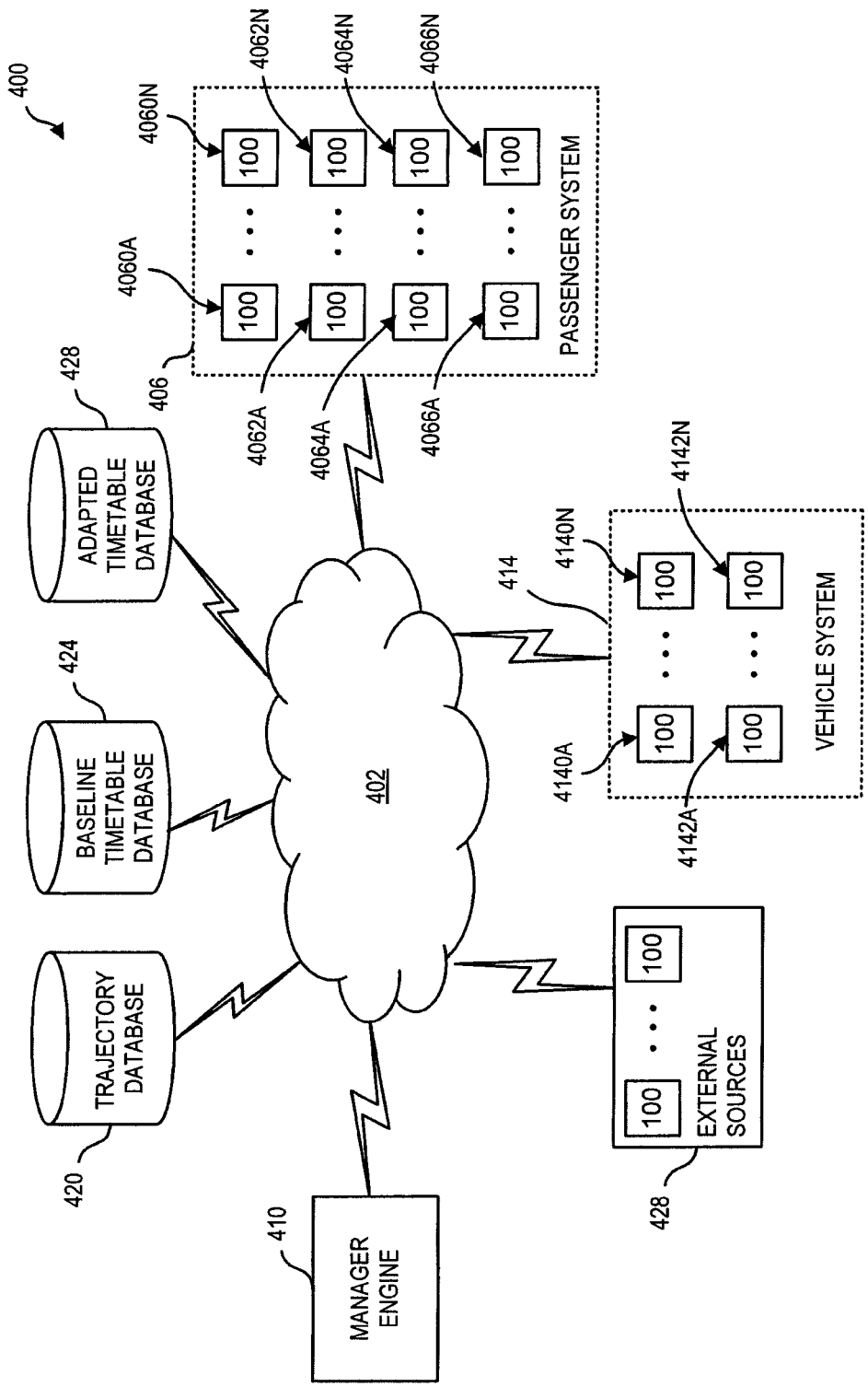
FIG. 4A is a block diagram of a system in accordance with an embodiment as set forth herein.

FIG. 4A is an exemplary block diagram of a system 400, in accordance with one or more aspects set forth herein. In the embodiment of FIG. 4, system 400 includes numerous devices, which may be or include computing nodes 100 as previously described, connected by a network 402. For example, network 402 may be a physical network or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

By way of explanation, FIG. 4A depicts an example environment. In one embodiment, system 400 can include a passenger system 406 and a manager engine 410. In one embodiment system 400 can include a vehicle system 414. In one embodiment, passenger system 406 can transmit passenger information of one or more passenger to a manager engine 410. In one embodiment, vehicle system 414 can transmit vehicle information of one or more vehicle to a manager engine 410. In one embodiment, system 400 can include a trajectory database 420. In one embodiment, system 400 can include a baseline timetable database 424. In one embodiment, system 400 can include an adapted timetable database 428. Shown as being external to manager engine 410, databases 420 and 424 and/or 428 can alternatively be co-located with manager engine 410. One or more program 440 which can run on one or more computing node 100 of manager engine can obtain information transmitted to manager information.

Regarding passenger system 406, passenger system 406 can include a plurality of computing nodes 100. In one embodiment computing nodes 100 at moving locations 4060A-4060N can be provided by mobile devices of passengers. At fixed locations 4062A-4062N computing nodes 100 can include fixed devices, e.g. PCs of passengers in one embodiment. At fixed location 4064A-4064N computing nodes 100 can be provided by fixed data collection terminals at various stations of a transportation network.

Regarding vehicle system 414, vehicle system 414 can include a plurality of computing nodes 100. In one embodiment computing nodes 100 at moving locations 4140A-4140N can be provided by mobile devices of vehicle operators of a transportation network. In one embodiment, computing nodes 100 at locations 4142A-4142N can be provided to determine a location of one or more vehicle. At locations 4144A-4144N computing nodes 100 can be provided by weigh terminal computing nodes that can weigh vehicles of a transportation network.

Figure 4C:
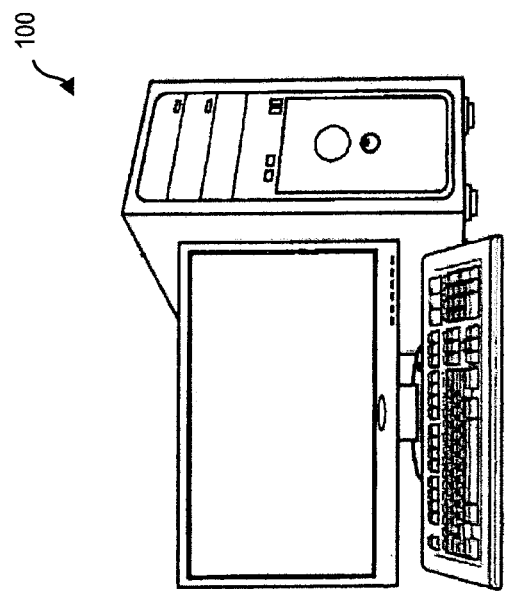
FIG. 4C is diagram of a computing node in accordance with an embodiment herein.
Figure 4B:
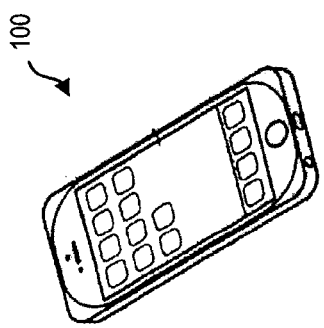
FIG. 4B is diagram of a computing node in accordance with an embodiment herein.

An embodiment of a computing node 100 provided by a mobile device is shown in FIG. 4B. In one embodiment, computing node 100 as shown in FIG. 4B can be a computing node 100 of a passenger provided as part of passenger system 406 depicted in FIG. 4A, e.g., at locations 4060A-4060N. In one embodiment, a computing node 100 of a vehicle operator provided as part of vehicle system 414 depicted in FIG. 4A, e.g., at locations 4140A-4140N can have the form depicted in FIG. 4B.

An embodiment of a computing node 100 provided by a PC is shown in FIG. 4C. In one embodiment, computing node 100 as shown in FIG. 4B can be a computing node 100 of a passenger provided as part of passenger system 406 depicted in FIG. 4A, e.g., at locations 4060A-4060N.

Figure 4D:
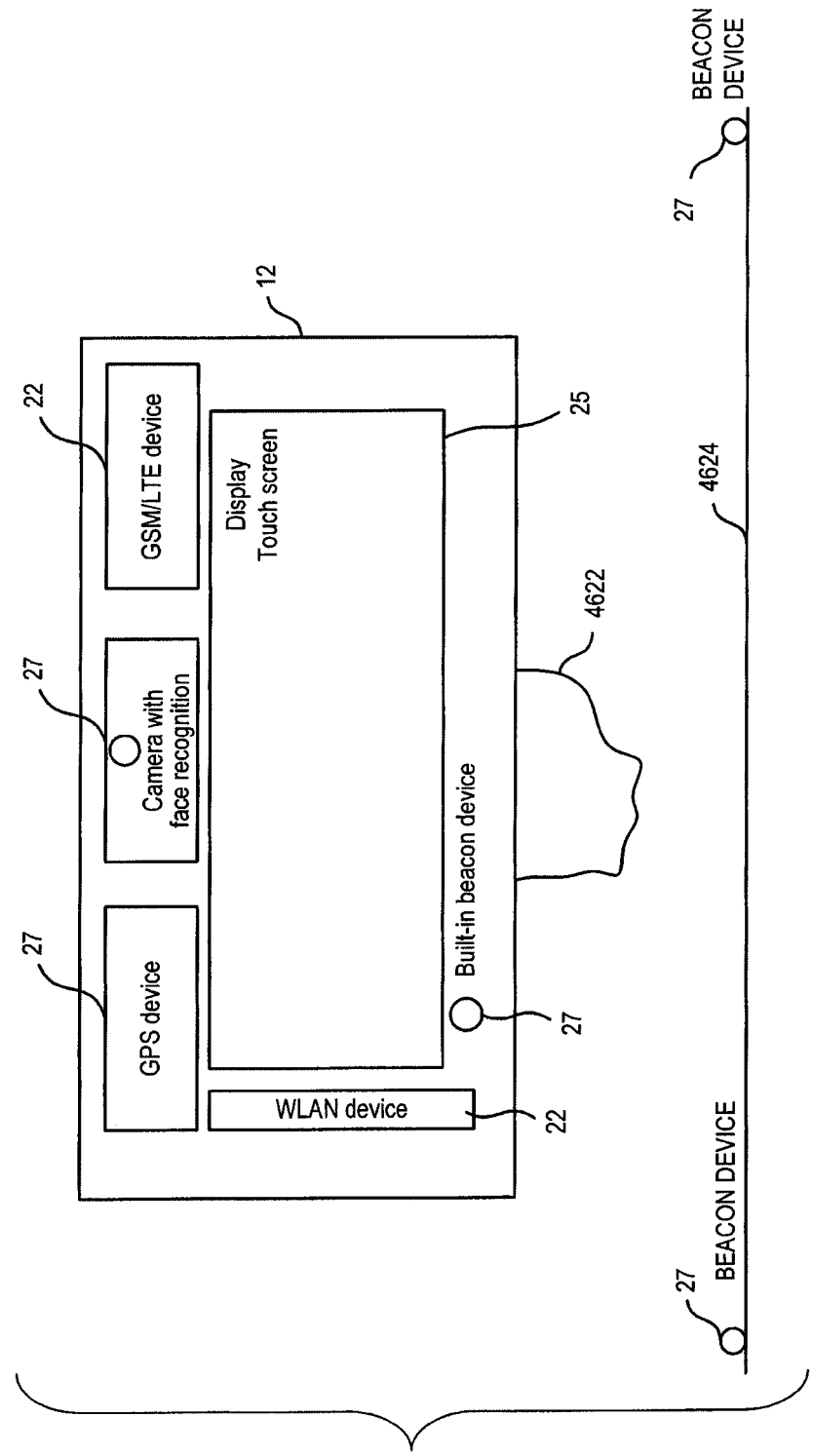
FIG. 4D is diagram of a computing node in accordance with an embodiment herein.

An embodiment of a computing node 100 provided by fixed data collection terminal is shown in FIG. 4D. In one embodiment, computing node 100 as shown in FIG. 4D can be a computing node 100 of a passenger system 406 depicted in FIG. 4A, e.g. at fixed locations 4062A-4062N. Computing node 100 as shown in FIG. 4D can be fixedly installed on building infrastructure 4622 at a central location of a station through which all passengers will move through when changing vehicles entering a transportation network or exiting a transportation network at a station. Computing node 100 can have a computer system 12 including a display 25 shown in block form in FIG. 3 which can be large in size so that it can be easily viewed by passengers moving through a station and can be configured as a touch screen. Display 25 can be configured to display timetable and other information as set forth herein. I/O interfaces 22 shown in block form in FIG. 3 can include e.g. a WLAN device and a GSM/LTE device as depicted in FIG. 4D. One or more sensor device 27 as depicted in block form of FIG. 3 can include, e.g., a GPS device, a camera and built in beaconing devices as depicted in FIG. 4D. System 400 can be adapted to perform facial recognition based on a signal provided by a camera of computing node. A passenger traveling through a station where computing node 100 is located can be detected using a beacon device and/or by facial recognition. A beacon device provided by one or more sensor device 27 of computing node 100 can act as a collector device scanning on different channels to detect nearby traveling passengers carrying a mobile device. A beacon device can scan e.g. on WIFI/Bluetooth/NFC or other technologies. Computing node 100 in one embodiment as depicted in FIG. 4D can have a plurality of sensor devices 27 provided by a beacon device that are distributed, e.g., at a ground level in a station spaced apart from display 25 and at locations for maximizing a likelihood that passenger will be detected using a beacon device when moving through a station.

Figure 4F:
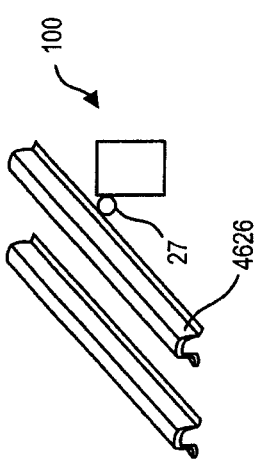
FIG. 4F is diagram of a computing node in accordance with an embodiment herein.
Figure 4E:
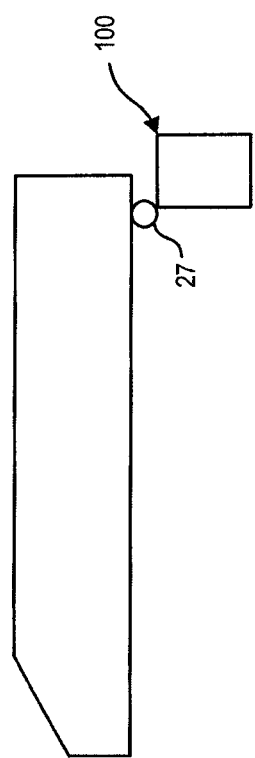
FIG. 4E is diagram of a computing node in accordance with an embodiment herein.
Figure 4G:
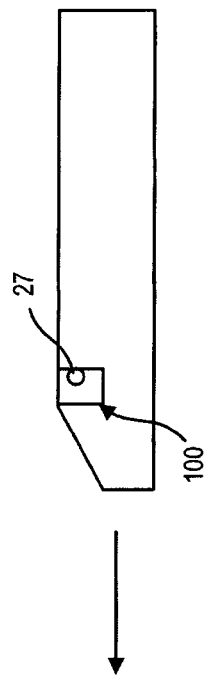
FIG. 4G is diagram of a computing node in accordance with an embodiment herein.

An embodiment of a computing node 100 of vehicle system 414 at locations 4066A-4066N to determine passenger location of passengers of a transportation network by determining a weight of a vehicle is shown in FIG. 4E. Computing node 100 in the embodiment of FIG. 4E can include one or more sensor device 27 provided by a load scanner. Alternatively or in addition one or more sensor device 27 can be provided by one or more counter e.g. coupled to one or more door of a vehicle.

An embodiment of a computing node 100 of vehicle system 414 at locations 4142A-4142N to determine a location of a vehicle is shown in FIG. 4E. In the embodiment of FIG. 4E computing node 100 is a computing node 100 of a transportation network that uses track sensor devices in communication with track 4626 to determine a location of a vehicle of a transportation network.

An embodiment of a computing node 100 of vehicle system 414 at locations 4142A-4142N to determine a location of a vehicle is shown in FIG. 4F. In the embodiment of FIG. 4F computing node 100 is computing node 100 mounted within a moving vehicle that can have one or more sensor device 27 provided by a GPS device for detecting a location of the moving vehicle. The moving vehicle can be e.g. a train, a bus, a jet airplane, a ship for water travel.

FIG. 5 depicts an embodiment of a process, in accordance with one or more aspects set forth herein. By way of example, the process described with respect to FIG. 5 can be performed using one or more program 440 running on one or more device e.g., of engine 410 (FIG. 4) having one or more computing node 100 as described with respect to FIG. 3. In one embodiment, one or more program 440 can provide the functionality of transportation network timing processing 96.

In the embodiment of FIG. 5, one or more program 440 at block 510 can perform obtaining passenger information of one or more passenger traveling within a transportation network; and at block 520 can perform providing one or more output based on a processing of the passenger information.

One or more program 440 in one embodiment at block 510 can obtain a passenger location for one or more passenger.

One or more program 440 in one embodiment at block 510 can obtain passenger information in the form of a passenger trajectory of one or more passenger.

One or more program 440 in one embodiment at block 520 for processing passenger information can determine a passenger flow matrix for one or more station.

One or more program 440 in one embodiment at block 520 for providing an output can provide an output in the form of an adapted timetable having one or more timing adjusted from a timing of a baseline timetable. A timetable can include a schedule of departures for vehicles of a transportation network.

One or more program 440 in one embodiment at block 520 for providing an output can provide an output in the form of a flow matrix output.

One or more program 440 in one embodiment at block 520 for providing an output can provide an output in the form of information recommending a change to a passenger trajectory.

In one embodiment, passenger system 406 as shown in FIG. 4 can provide an interface to a passenger e.g. on a computing node 100 of the passenger to allow a passenger to enter trajectory information to register trajectories from a set of recommended routes.

In one embodiment, one or more program 440 at block 510 and 520 can obtain (block 510) and process (block 520)

trajectory information from registered trajectories and from tracing registered passengers through the transportation network 600.

In one embodiment, one or more program 440 at block 510 and 520 can obtain (block 510) and process (block 520) information about current passenger needs (in terms of providing connections with short wait times for their trajectories), passenger movements, and data about additional status data influencing the travel time (e.g., congestions, break-downs, outages, bad weather).

In one embodiment, one or more program 440 at block 520 can process information to adapt a timetable to the current needs and network conditions accordingly. One or more program 440 at block 520 to perform processing can determine an adapted timetable at block 520 to provide an output can output an adapted timetable.

In one embodiment, one or more program 440 at block 520 can process information other than passenger information, such as vehicle information. Vehicle information can include information on a location of one or more vehicle of the transportation network.

In one embodiment, one or more program 440 at block 520 to provide an output can transmit the output to one or more user of the transportation network, e.g. a computing none 100 of one or more passenger and/or one or more vehicle operator and/or one or more transportation network operator.

In one embodiment, one or more program 440 at block 520 to provide an output can log one or more adapted timetable to the adapted timetable database 428 so that this information (adapted timetables) can be examined, e.g. by program processing or otherwise for the next release of a baseline timetable.

In one embodiment, one or more program 440 at block 520 for performing processing can determine one more flow matrix. In one embodiment, flow matrices record information about passenger flows on the vertices of the transportation net in so called flow matrices. In one embodiment, flow matrices contain either actual passenger flows or normalized flows through an interchange station. In one embodiment one or more program 440 at block 520 can determine a cumulative wait time. A cumulative wait time can be determined as a sum of wait times at all stations of a transportation network.

In one embodiment, one or more program at 440 at block 520 can use one or more determined flow matrix to determine the cumulative wait time at a station as the sum of the products of flow matrices and adapted timetables.

In one embodiment, one or more program 440 at block 520 to provide an output can output one or more determined flow matrix.

An output herein, e.g., an adapted timetable, a determined flow matrix, other information, can be output for display on a display 24 and/or 25 of a computing node 1000. A computing node 100 can be a computing node 100 e.g. of a passenger user, a vehicle operator user and/or a transportation network operator user.

In one embodiment, one or more program 440 at block 520 to provide an output can output one or more determined adapted timetable to a display device, e.g., a display device of a computing node 100 of a user.

In one embodiment, one or more program 440 at block 520 to provide an output can provide an output to adjust a timing of one or more vehicle of the transportation network, e.g. can output an adapted timetable having one or more adjusted departure time. In one embodiment where an output that is provided at block 520 is an output to adjust a timing of a vehicle, a machine vehicle operator can operate a vehicle in accordance with an output timing parameter, e.g. as part of an adapted timetable. In one embodiment where an output that is provided at block 520 is an output to adjust a timing of a vehicle, a human vehicle operator can operate a vehicle in accordance with an output timing parameter, e.g. as part of an adapted timetable.

Figure 6:
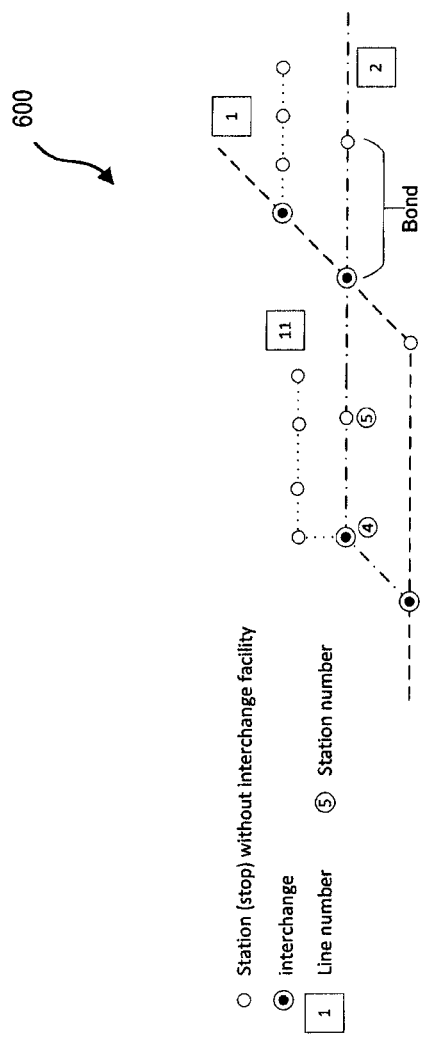
FIG. 6 is a diagram illustrating a transportation network in accordance with an embodiment as set forth herein.

Referring to FIG. 6 a transportation network 600 can contain major lines running through non-interchange and interchange stations and minor lines branching from major lines. Minor lines can run through non-interchange stations. An interchange station can be station where a passenger can interchange between a first vehicle traveling on a first line and a second vehicle travelling on a second line. A bond can be regarded an elementary stretch of a line connecting two stations. A route can be regarded as a possible way through the transportation network 600 starting at one station and ending at another station. A trajectory can be a route travelled by a passenger (either currently travelled or once travelled in the past) containing 1, . . . , n lines and 0, . . . , k interchange stations. In one embodiment, passenger system 406 can include a one more computing node 100 allowing one or more a passenger to enter trajectory information, which information can be obtained by one or more program 440.

In one embodiment, users of system 400 can plan their trajectories either in advance (e.g., at home using a computing node 100 provided by a PC of passenger system 406) or during their journey using an application e.g. using a computing node 100 provided on a mobile device (e.g., a mobile phone) of passenger system 406.

Using a computing node 100 of passenger system 406 a passenger can register their trajectory in the trajectory database 420 of system 400. In one implementation the registration could be only used to convey information about trajectories, in another implementation a payment and ticketing system could be connected.

In reference to dynamic selection of a trajectory, a computing node 100 provided by a mobile device of passenger system 406 can includes the same functions as a computing node 100 provided by a fixed device (e.g., a PC) of passenger system 406 but the computing node 100 provided by a mobile device can be used during the trip, e.g. a passenger may change their route based updated routes provided by a route planner function of one or more program, 440. Additionally, with a computing node 100 including a sensor device 27 (FIG. 3) provided by a GPS device, the dynamic route planner can utilize GPS information for dynamic route planning and can provide the GPS position of the passenger to the trajectory database 420, if authorized by the user. One or more program 440 can obtain information of trajectory database 420.

Regarding passenger system 406 in one embodiment, data collection from and data transfers to passengers in selected locations (stations, platforms) can be performed using computing nodes 100 provided by data collection terminals e.g. as shown in FIG. 4D in one embodiment at fixed locations 4062A-4062N of various stations of system 400.

In one embodiment passenger information obtained by one or more program 440 at block 510 can include passenger location information. In one embodiment, data collection terminals, e.g. as shown in FIG. 4D, can be installed for collecting location information of known passengers (e.g. by near field communication (NFC) or Bluetooth) and for transferring timetable data and route recommendation to passengers (acting in this way like beacons). In another embodiment, computing nodes 100 of passenger system 406 provided by mobile devices of passenger system 406 can output passenger location information of a passenger without use of such data collection terminals and can be in bi-directional communication with manager engine 410 without the intermediary of such data collections terminals.

A computing node 100 of a passenger provided by a mobile device can include one or more sensor device 27 (FIG. 3) provided by a GPS device for output of passenger coordinates. In one embodiment, passenger location information that can be obtained by one or more program 440 at block 510 can be output by a vehicle weight sensor as set forth herein, e.g., in connection with FIG. 4E. Further regarding vehicle system 414 in one embodiment, in some or all vehicles operated by the transportation network computing nodes 100 can include a sensor device 27 (FIG. 3) provided by a load scanner for providing passenger location information in the form of a current number of passenger travelling on a vehicles. Possible implementations of one or more sensor device 27 include automatic weight sensor devices coupled with the suspension. One or more sensor device 27 can alternatively or in addition include e.g. counter sensor devices coupled to doors of a vehicle. Such computing nodes 100 for obtaining passenger location information by obtaining information on a weight of a vehicle in order to determine a weight of passengers therein can be regarded to elements of passenger system 406 as well as elements of vehicle system 414.

Regarding vehicle system 414 vehicles and/or vehicle operators of the transportation network 600 can provide automatic input about the current location of a vehicle (e.g., via a sensor device 27 as shown in FIG. 3 provided by a GPS device) and/or manual input (current traffic situation like congestions, accidents, road conditions) using computing nodes 100 of vehicle system 414. An example of an on vehicle computing node 100 is set forth in FIG. 4G herein.

Further regarding vehicle system 414 in one embodiment, from a central point, transportation officers can provide information about the fleet (availabilities of vehicles), staff (availability of vehicle operators), traffic, road conditions, observations from stations (crowed platforms), etc. using one or more computing node 100 of vehicle system 414, e.g., a computing node running one or more program 440.

Referring again to FIG. 4 in addition to passenger system 406 and vehicle system 414 system 400 can include external sources 428 which can provide information relevant for adapting the timetable which typically may not be produced by passenger system 406 or vehicle system 414 without external sources like weather forecasts, police reports on traffic conditions, information about mass events (e.g., football matches or fairs), etc.

In one embodiment, one or more program 440 can obtain for processing at block 520 one or more or the following: passenger location of one or more passenger from the passenger system 406, a predefined baseline timetable from baseline timetable database 424, the currently used trajectories and historical trajectories from the trajectory database 420, the vehicle operators' information from the vehicle system 414, the central office information from the vehicle system 414, passenger occupancy of one or more passenger from passenger system 406 and/or vehicle system 414, and/or additional information from external sources 428.

In one embodiment, one or more program 440 can output an adapted timetable. One or more program 440 e.g., running on one or more computer node of manager engine 410, can output at block 520 an adapted timetable to one or more user by transmitting an adapted timetable to one or more computing node 100 of one or more of passenger system 406 and/or vehicle system 414. A user can be e.g. a passenger or a vehicle operator.

Changes made to a baseline timetable can be logged and output to the change log of adapted timetable database 428. On a regular basis, human analysts (operators of transportation network 600) of a transport office of transportation network 600 can review the changes looking for patterns to improve the predefined baseline timetable in the next release. Alternatively to or in addition to being transmitted to one or more computing node 100 of passenger system 406 and/or vehicle system 414, an output provided at block 520 by one or more program 440 (e.g., any output set forth herein) can be transmitted e.g., to a computer node 100 of an operator (e.g., for display by a display), such a computing node 100 that runs one or more program 440.

Regarding trajectory selection in one embodiment, a passenger can register a trip using a route planner application running on a computing node 100 of passenger system 406. This can be seen as "booking a trip" or "creating a trajectory" using e.g., a computing node 100 provided by a mobile device. System 400 can record the lines and interchanges (transfers between the lines) as "in use by a passenger". However, system 400 in one embodiment can only assume that the trajectory is traveled, unless the passenger system 406 "confirms" traveling the route by sending location e.g. GPS data.

In one embodiment, system 400 can be adapted to prevent misuse by making personal user registration compulsory for selecting trajectories ("booking trips"). Otherwise system 400 may be prone to malicious attacks aiming to distort the timetable by automated, repeated registering for the same trajectory.

Regarding tracking of trajectories, passengers using computing node 100 provided by a mobile device (as shown e.g., in FIG. 4B) may activate location tracking, e.g., a GPS tracking function or near field communication after the passengers select a trajectory. In one embodiment, one or more program 440 by obtaining passenger location information at block 510 and processing that information at block 520 can register that the trajectory is indeed traveled and at block 520 can provide an output in the form of a dynamic recommendation during the trip.

In one embodiment, a passenger by entering appropriate designating passenger information into a computing node 100 of passenger system 406 can volunteer to be a "traceable passenger". One or more program 440 can obtain the designating passenger information permitting system 400 to collect statistical data about frequently used trajectories and interchanges, i.e. the passenger flow through the transport network 600 can be recorded. This can be expressed by denoting probabilities for a passenger traveling at a certain bond of transportation network 600 for continuing on the same line or changing to different lines at the next stop.

As for tracking trajectories above, the one or more program 440 can learn about interchanges desired by the passengers. In one embodiment of system 400 system 400 can be adapted so that "only" statistical data is needed (but not personal data). In such embodiment, trajectories can be anonymized after the trajectory was travelled.

In one embodiment, one or more program 440 at block 510 for obtaining passenger information can obtain passenger location information. Location information tracking that can be performed at block 510 can be performed in various ways using data obtained from passenger system 406, e.g., GPS tracking using a computing node 100 provided by a mobile device e.g., mobile phone, using computing nodes 100 provided by data collection terminals e.g., as shown in FIG. 4D installed in stations or in vehicles using NCF (near field communication) and/or electronic ticket functionality and/or using the Bluetooth function of a computing node 100 provided by a mobile device, e.g. mobile phone. In one embodiment, Bluetooth and NCF location tracking may have an advantage over GPS tracking in one embodiment in that location information may be more readily available in covered locations, like a metal bus shelter, in a station building or in a subway. In one embodiment, tracking using GPS signals can be advantageous. Reporting a vehicle load scan of vehicle system using a computing node 100 of passenger system 406 adapted to weigh a vehicle, passengers can indicate the utilization of a transport link by contributing to the load. While load scan information supports capacity planning, load scan information in one embodiment can be supplemented with information about utilization of interchange stations between lines. For instance if many people leave a train at a stop and many people board a bus at the same stop a few minutes later, it is an indication for a strongly frequented interchange station, but it does not rule out the possibility that most of the train passengers exiting the transportation system 600 and new bus passengers enter the transportation system 600.

In one embodiment at block 520, one or more program 440 for processing passenger information, can record information in vertices. One or more program 440 at block 520 can record information about passenger movement in the transportation network 600 using the vertices (i.e. on the stations) in datasets that can be referred to as flow matrices (FM). The following notation can be used: (A) Each flow matrix can identified by a number 1=1, . . . , s like FM3, where s is the number of stations; (B) The bonds connected to the interchange station are label by the number of the line. If multiple lines are running in the same track, logically multiple bonds exits; (C) Direction is indicated by positive and negative line numbers. Bonds north and east of the interchange station have positive numbers, bonds south and west of the interchange station have negative numbers.

Figure 8:
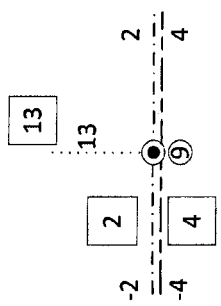
FIG. 8 is a diagram illustrating a section of a transportation network in accordance with an embodiment as set forth herein.
Figure 7:
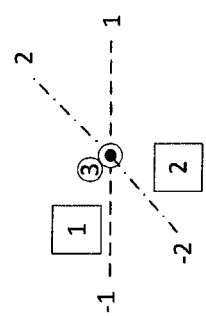
FIG. 7 is a diagram illustrating a section of a transportation network in accordance with an embodiment as set forth herein.

In the example of FIG. 7 lines 1 and 2 are depicted as running through interchange station 3. In the example of FIG. 8 Lines 2 and 4 are depicted as running through interchange station 7 sharing the same track. Line 13 terminates at interchange station 9.

The passenger flow on an interchange station can be described by an n*n square matrix, where n is (2*number of lines traversing the intersection)+(number of lines terminating on the intersection). The rows contain the bonds where the passengers travel from, the columns contain the bonds where the passengers are traveling to. Consider FIG. 7 as an example, the matrix for interchange station 3 on the left hand side has the dimension of (2*2)×(2*2)=4×4, the matrix for interchange station 7 on the right hand side has the dimension (2*2+1)×(2*2+1)=5×5.

An adapted timetable that can be output by system 400 aims to optimize interchanges between lines. At block 520 one or more program 440 can determine a flow matrix, determine an adapted timetable and output an adapted timetable.

Figure 9:
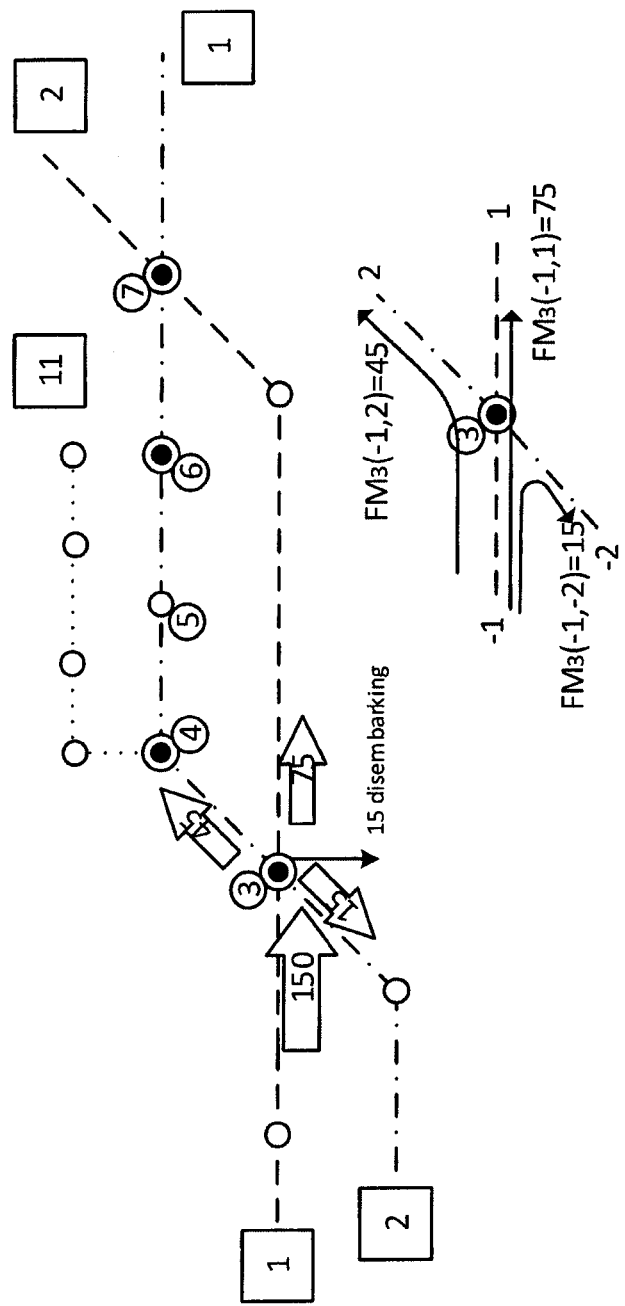
FIG. 9 is a diagram illustrating a passenger flow at a station of a transportation network in accordance with an embodiment as set forth herein.

FIG. 9 depicts passenger flow through an interchange station in one embodiment. In a given time interval, t, 150 passengers travelling on line 1 eastward toward the interchange station 3 on line 1. Half of the passenger stay in the vehicle, 45 change to northeast bound line 2, 15 change to the southwest bound line 2, and 15 disembark at this stop, however the flow of disembarking passengers is not considered in this context. The passenger flow on an interchange station 3 is described by a square matrix containing 4×4, however the diagonal entries are assumed as zero, as (nearly) nobody travels immediately back. One or more program 440 at block 520 can determine the flow matrix FM3 as is shown in FIG. 10 depicting flow at interchange station 3 during time.

FIG. 10 is a passenger flow matrix describing the flow of passengers on board of vehicles and moving between vehicles at an interchange station 3 depicted in FIG. 9. In example passenger flow matrix of FIG. 10 the flow shown in FIG. 9 is found in the second data row (hatched) of the table matrix.

Additionally to the passengers staying in a vehicle and changing to other lines, passengers boarding a line at this station 3 as shown in FIG. 9 can be considered.

It will be seen that cells of a flow matrix in one embodiment can represent a number of passengers traveling through an interchange station within a selected time interval. If a starting time of the time interval is made earlier or if the ending time of the time interval is made later, the number of passengers can be expected to increase. If a starting time of the time interval is made later or if the ending time of the time interval is made earlier, the number of passengers travelling through an interchange station can be expected to decrease. Passengers travelling through an interchange station can include passengers that disembark a first vehicle and board a second vehicle. Passengers travelling through an interchange station can include passengers that disembark a first vehicle and exit the interchange station. Passengers travelling through an interchange station can include passengers that remain on the same vehicle that travels through the interchange station.

FIG. 11 illustrates a flow matrix describing flow of passengers at interchange station 3 and FIG. 9 with different data highlighted.

Conveniently the number of embarking passengers can be recorded on the diagonal locations of the passenger flow matrix. In the flow diagram of FIG. 11A above on the right hand side the number of passengers traveling on the line 2 heading northeast in a given time interval are shown. These numbers (in hatched highlight) are shown on the far right column in the passenger matrix above. FIG. 11B graphically illustrates the data depicted in FIG. 11A.

The following two matrices of FIGS. 12A and 12B are examples for an interchange station where a line terminates and for a non-interchange station (a station without interchange). FIGS. 12A and 12B are passenger flow matrices depicting passenger flow information.

Regarding passenger flow at stations 4 and 5 illustrated in FIG. 9, from the previous example we know that 180 passengers are travelling on line 2 northeast toward station 4 (direction marked −2 for station 4), 10 are disembarking, 10 change to line 11 and 20 new passengers embark on the vehicle.

Additionally to the recording of total number of passengers travelling through a station in a certain time interval, one or more program 440 at block 520 can determine the relative number of passengers, i.e. express the flow in percentages. The matrices can normalized in such way that total amount of passengers traversing a station or entering a station is set to 100%. At block 520 one or more program 520 can output a determined passenger flow matrix. A determined passenger flow matrix can a normalized passenger flow matrix as depicted in FIG. 13 or a non-normalized passenger flow matrix as set forth in the remaining examples herein.

FIG. 13 illustrates a normalized flow matrix of station 3 depicted in FIG. 9. The normalized passenger flow matrix allows to compare flows of different points in time which each other, for instance at different times of the day or different day of the week. Possible pattern recognition could include: reverse of passenger flows during day (to work, from work) or specific trajectories are frequented during certain hours of the day or days of the week which can be supported by reduced connection delays at the interchange station.

In one embodiment, one or more program 440 can process passenger information provided by trajectory information in the form of directional information. One or more program 440 at block 510 can obtain data to populate flow matrices being determined from one or more of the following set forth herein: 1.) registered trajectories without tracking, 2.) Registered trajectories with tracking, and/or 3.) Continuous tracking without a registered trajectory.

One or more program 440 in one embodiment can assign different weights to obtained passenger information before the passenger information contributes in an averaging process. In one implementation, actually travelled registered routes with tracking can be accorded a higher weight by one or more program 440 at block 520 than registered routes without tracking. In another implementation registered routes in general can be accorded a higher weight than continuous tracks, as the "traceable passengers" providing typically a much larger data sample as the passengers registering their routes manually.

In one embodiment, one or more program 440 at block 520 can average and record determined passenger flow matrices in one or more in time intervals, e.g. some minutes, an hour or for a day. Determining passenger flow matrices for different time intervals can offer various advantages: (1) Adaption to reoccurring traffic pattern instead of having the same hourly schedule in the timetable through the day with the same interchange station wait times, a custom schedule can be calculated based on passenger demands. (2) Consideration of historic and current data historic and current data can enter the average process with different weights, the older the data, the smaller is the weight. For instance data samples could be weighted with a factor e.g. 1/(age in days).

The preferred time interval determined at block 520 by one or more program 440 can depend on the characteristics of transportation network 600 (for instance whether the traffic flow is constant over the day or reversing between morning and afternoon) and on the size of the available data sample provided by the passengers. Also one or more program at block 520 can apply different time intervals (e.g. hourly, daily, weekly) in parallel to provide different views.

In one embodiment one or more program 440 at block 520 can record data in the actual flow matrices FM,(t) and the normalized flow matrices FMNi(t) for every station i and every time interval t.

In one embodiment at block 510 one or more program 440 can obtain data containing passenger volume information, and out block 520 one or more program 440 can process such data.

The volume of passengers traveling in vehicles, denoted as the vehicle volume data V, can be recorded on the vertices of the transport grid like the passenger flow matrices as set forth herein.

Figure 14:
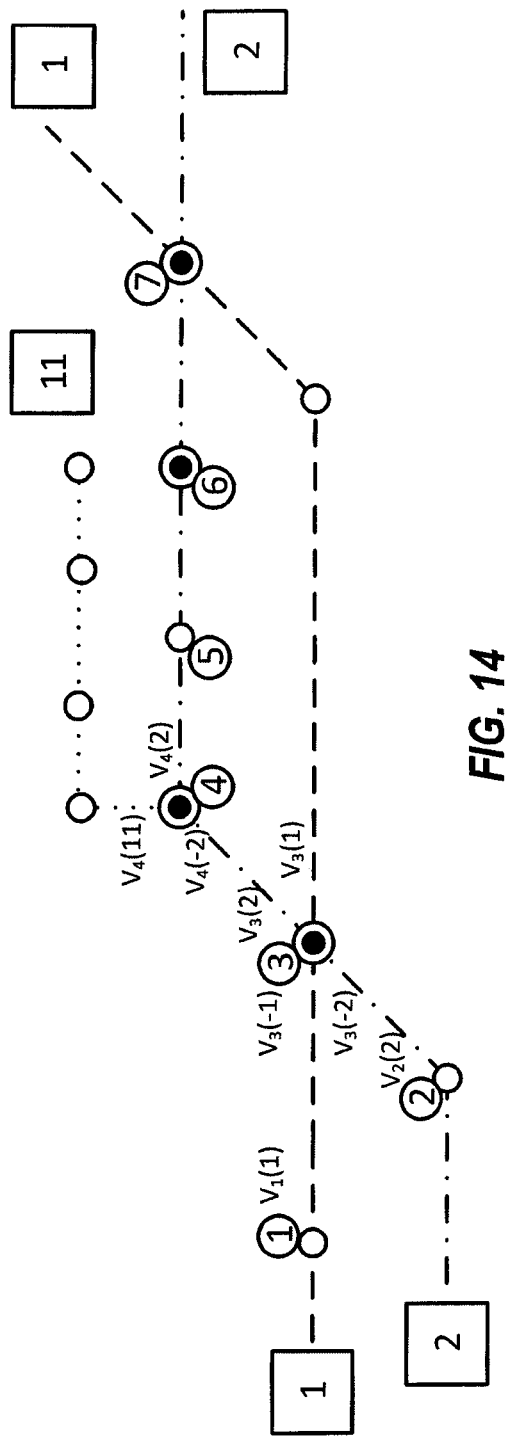
FIG. 14 is a diagram illustrating passenger volume in accordance with an embodiment as set forth herein.

FIG. 14 illustrates vehicle volume data in one example. For each station,s an n-dimensional vector V, contains the absolute number of passengers travelling away from the station, e.g. V3(−2,t) denotes the passenger volume away from station 3 on line 2 in southwest direction at given time interval t.

In one embodiment at block 520 one more program 440 can determine a wait time. The current wait time WT,(t) (sum of delays for all passenger) for a station i can be calculated from the flow matrix FM(t) at a given time t $WT_i(t) = E\ j,k\ F\ Mi(j,k,t)*Ti(j, k, t)$ (Eq. 1) Where j is the row index ("from") and k is the column index ("to") of the flow matrix of dimension n*n.

One or more program 440 at block 520 for processing obtain passenger information can record timetable information in T where TiO,k,t) denotes the wait time at station i coming from direction j going to direction k at time t. As an example consider the passenger flow at station 3 coming from the west (direction −1) at 9:42 as also shown in FIG. 9 herein.

Figures 15, 16:
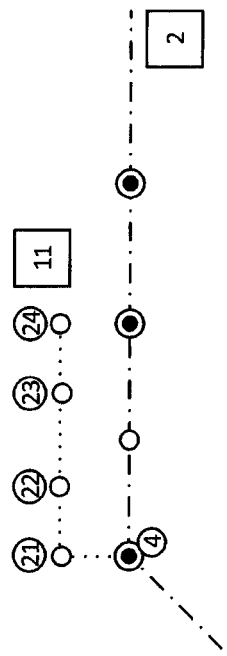
FIG. 15 is a timetable in accordance with an embodiment as set forth herein.
FIG. 16 is a diagram illustrating a section of a transportation network in accordance with an embodiment as set forth herein.

In FIG. 15 there is illustrated an exemplary timetable that one or more program 440 can determine at block 520 based on a processing of passenger information at block 520. One or more program 440 at block 520 can output a determined timetable.

The upper part of the exemplary timetable of FIG. 15 shows an excerpt of the timetable for station 3. Passengers changing between lines 1 and 2 need 3 minutes to walk from platform to platform. This time is subtracted from the wait time. The row of the matrix T3 (j=−/,k, t=09:42) contains the wait times for passengers traveling in the directions k=1 (1 minute as the vehicle stops at the station), k=2 (6 minutes as passengers catch the next vehicle), and k=−2 (9 minutes as passengers miss the next vehicle while they are changing the platform). If the vehicle runs on time, the diagonal entries (denoting passengers entering the transport system at this station) Ti6=k,t) are zero. If the vehicle is delayed diagonal entries Ti(j=k,t) contain the delay in minutes. The complete cumulative current wait time for all passengers in the system can be expressed as the sum over all stations $WT(t) = E\ i-iWTi(t)$ (Eq. 2).

One or more program 440 at block 520 can determine current wait time WT,(t) for the actual minute t and the timetable matrix T is prepared for every minute, but the flow matrix can be calculated for a time interval to have it filled with a reasonable statistic. In case the flow matrix is defined for 10 minutes intervals FM/(j,k, t=9:40-9:50) would be used in the example of FIG. 15.

In examples set forth herein above the calculation of the wait time contains only data from sources 1-3 (trajectories and tracking). One or more program 440 at block 520 can determine the wait time from the normalized flow matrix FMNi(t) of the station and the passenger volume data 171(k) at a given time t according to the formula $WTi(t) = E\ j,k\ (j,k,t)*Vi(k,t)*Ti(j,k,t)$ (Eq. 3). This approach can be statistically advantageous, e.g., under the following conditions: (1) Flow data (passenger interchanging behavior) is relatively static over a longer period of time. (2) There is less data for sampling available for the flow matrices, so flow matrix data is sampled over a longer period of time. (3) Volumes are fluctuating faster than flow directions. (4) Volume data is widely available.

In one embodiment, one or more program 440 at block 520 to determine an adapted timetable can alter one or more certain departure times to reduce the overall wait time of passengers. In principle a variety of kinds of deviations from a baseline timetable are possible, e.g.: (1) Vehicle departures can be delayed by purpose; (2) Vehicles can leave prematurely. In one embodiment, one or more program 440 at block 520 to perform processing can confirm than an adapted timetable can yield advantageous results by determining a cumulative wait time attributable to application of an adapted timetable.

In one embodiment, delay of departures may be well adapted for use with peripheral lines. A peripheral line starts at an interchange station, distributes passengers across an area, waits a certain time at the terminus, collects passengers from the area, brings them to the interchange station and waits at the interchange station for its next turn.

Having the momentary wait time $WT_i(t)$ calculated as described above for different possible delays at the interchange station and the stops of the peripheral line a decision can be made whether a delay would benefit passengers. In one embodiment, one or more program 440 at block 520 to determine an adapted timetable can generate plurality of candidate timetables, each having a different set of departure times. One or more program 440 at block 520 can determine a cumulative wait time for each candidate timetable and can select as an adapted timetable one of the candidate timetable that provide a reduced wait time as compared to wait time attributable to use of a baseline timetable. One or more program 440 at block 520 can determine a cumulative wait time for each candidate timetable and can select as an adapted timetable the candidate timetable that provides the smallest wait time out of the plurality of candidate adapted timetables.

As an example consider the peripheral line 11. The wait time $WT_i(t)$ is calculated and summed up for the stops i=4, 21, 22, 23, 24 for the outbound and subsequent inbound journey for several delays, e.g. 0, 1, . . . , 10 minutes. In case the feeder line 2 is delayed by several minutes and that few passengers enter line 11 on the outbound journey, a deliberated delay of line 11 could reduce the overall wait time.

In FIG. 16 there is illustrated a diagram for determination of wait times calculated for a peripheral line. Providing of deliberate delays to reduce the overall wait time suits typically peripheral lines as the overall impact on the transportation network can be easily calculated. Deliberate delays on major lines could create cascading delays. Additionally the computational effort could be enormous when effects of deliberate delays ripple through the transportation network. On peripheral lines the adverse effects of a deliberate delay can be fairly well controlled if the deliberate delay is less than the wait time at the terminus plus some possible incidental delay.

Consider as an example the timetable and passenger flows for station 4 as depicted in FIG. 16. Most of the passengers travel through the station on line 2. Passengers starting on line 11 typically change to line 2 southwest bound and take the same way back. From the published timetable (upper left table in the diagram) the system calculates (at a given time say 7:20) the number of waiting minutes for each possible route (upper right corner in the diagram). For instance changing from line 2 east bound (arriving at 7:31) to line 11 (departing at 7:36) a passenger requires 3 minutes to change platforms and waits for 2 minutes. A passenger continuing on line 2 waits 1 minute in the station. When all vehicles run on time, the wait time for passengers entering the system is regarded as zero.

In FIG. 17A a timetable is illustrated depicting wait times at station 4 when all vehicles are on schedule. Taking the known flow matrix $FM4(t)$ for station 4 for the select time interval 7:00-8:00 the current cumulative wait time $WT4(t)$ (sum of delays for all passenger) can be calculated as shown in the lower half of the diagram. (FIGS. 17B-17D). WT4 $(t=7:20)=\sum_{j,k=-2,2,11} F1144(j, k, t)*T4(j, k, t)=735$ minutes (Eq. 4)

Consider now the case that the line 2 east bound runs 5 minutes late. Consequently the 30 passengers changing to line 11 have to wait for the next turn as they cannot change the platform instantaneously. Additionally the 25 passengers boarding line 2 have to wait for 5 minutes. The wait time for all passengers increases to 1,610 minutes.

In FIG. 18A there is shown a timetable depicting wait times at station 4 when the line 2 east bound is delayed. Flow matrices are depicted in FIGS. 18A-18A to reduce the overall wait time the system adapts the departure time of line 11 by 5 minutes to 7:41. For passengers changing from the delayed line 2 to line 11 the wait time is reduced to normal (improvement of 750 minutes), however the few passengers boarding line 11 have to wait for 5 minutes (contributing to 25 minutes). The total gain is 725 minutes.

In FIG. 19A there is depicted a timetable illustrating a reduction of the wait time by delaying the departure of line 11. Flow matrices are depicted in FIG. 19B-19D.

Mathematically a delay departure of only 3 minutes would reduce the wait time. In one embodiment, one or more program factors for a time to allow passengers, including more agile and less agile passengers to catch line 11. Passengers boarding line 11 at the stations 21, 22, and 23 can be considered. In one example only one passenger is boarding at each stop, the wait time applying the adapted timetable is $WT(t)=WT4(t)+WT2i(t)+WT22(0+WT23(t)=885+5+5+5=900$, in comparison to 1600. A delay of a single vehicle in one example can have significant impact on a cumulative delay, e.g., if numerous passengers miss a connection as a result of a delay. Techniques herein can be useful, e.g., in reducing a cumulative wait time of passengers of a transportation network. In one embodiment, a cumulative wait time can be determined as the sum of wait times at an entirety of stations of a transportation network. In one embodiment, a cumulative wait time can be determined as the sum of wait times at a subset of stations of a transportation network, e.g., at a subset of stations that can be selected e.g. using a user interface of one or more computing node 100 running one or more program 440.

Figure 20:
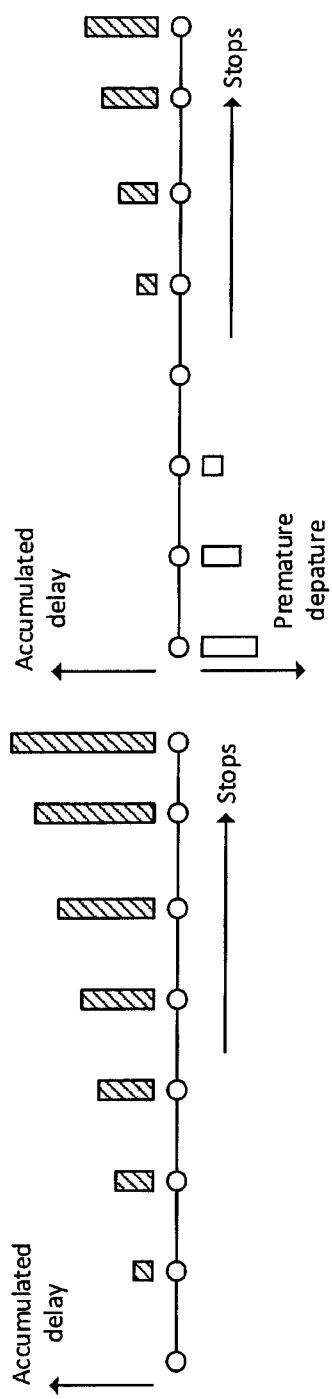
FIG. 20 is a diagram illustrating determining of a premature departure in accordance with an embodiment as set forth herein.

In one embodiment, one or more program 440 can determine to perform processing at block 520 a premature departure time, and can provide an output at block 520 by output of the premature departure time. A departure time herein can be output as part of an adapted timetable. A premature departure time can be a departure time earlier that a baseline departure time of a baseline timetable. In one embodiment one or more program 440 can determine and output premature departure time at block 520 such that the overall wait time could rise as some passengers miss their planned turn or miss a connection. However intentional premature departures could compensate delays accumulated during the trip, e.g., due to a large amount of passengers boarding and alighting the vehicle. In this way consequent effects are reduced. As an example, the overall wait time could be reduced if a vehicle of a major line starts earlier from the terminus so that it is expect to arrive in time at the central station. FIG. 20 provides a diagram illustrating reducing the delay by departing prematurely.

To make a decision about a premature departure, one or more program 440 at block 520 can determine a momentary wait time $WT_i(t)$ for each station affected and summed up for the stations on the line considered and for possible connections. Practically, not all possible connections can be evaluated for various premature departure times, however as the passenger flows are known, a reasonable cut-off can be introduced, i.e., in one embodiment a passenger flow below a certain threshold will not be considered. The concept of premature is more easily acceptable for the passengers when many of them using a mobile route planner and can be informed during a trip.

At block 520 one or more program 440 can provide an output. In one embodiment, the output can be provided by an adapted timetable. In one embodiment, one or more program 440 at block 520 can output an adapted timetable to a computing node 100 e.g., of a passenger and/or vehicle operator and or a transportation network operator.

In one embodiment, one or more program at 440 at block 520 can provide an output in the form of a route planner.

Passengers who have registered a trip in the route planner and "traceable passengers" (see section information gathering) are contacted by system 400 in the following ways. In one embodiment one or more program 440 at block 520 to provide an output can transmit information to passengers, e.g., in the form of an adapted timetable, informing passengers about shifted departure times for alternative routes to minimize their travel time in the current situation and to shift passenger loads away from overloaded vehicles.

Because one or more program 440 has recorded the location of "traceable travelers" (either by GPS or by near field communication) it is not necessary in all cases to transmit the full route update (containing maybe several interconnections) to the passenger, rather for convenience of the passenger only next step may be transmitted by one or more program 440 at block 520 (e.g., "change now to line 5") to the passenger via a computing node 100 of the passenger. Near field communication (NFC) devices serve as physical beacons. When using GPS logical beacons can be defined.

One or more program 440 at block 520 can determine an adapted timetable adapted to passengers needs and also at block 520 can provide an output by transmitting the adapted timetable to a computing node 100 of a user, e.g., a passenger and/or a vehicle operator and/or transportation network operator. The information collected and processed by one or more program 440 can be utilized by system 400 for other purposes as well, e.g., capacity management.

Whenever feasible in a given (relatively short) time window alterations to the transportation capacity (number of vehicles, number of seats per vehicle) can be performed dynamically.

In one embodiment, a ticket selling channel can be provided at transportation network 600. In case a certain exceptional demand for a certain trajectory is observed the transportation organization can contact current and potential travelers to sell them (maybe with an uplift) tickets for an additional connection. These additional connections could be interesting for the passengers to avoid a crowed connection or to travel even in less time. For instance a transportation network service provider could schedule additional turns without the intermediate stops to reduce the load on the scheduled connection and transport a subset of the passengers faster to their destination.

Figure 21:
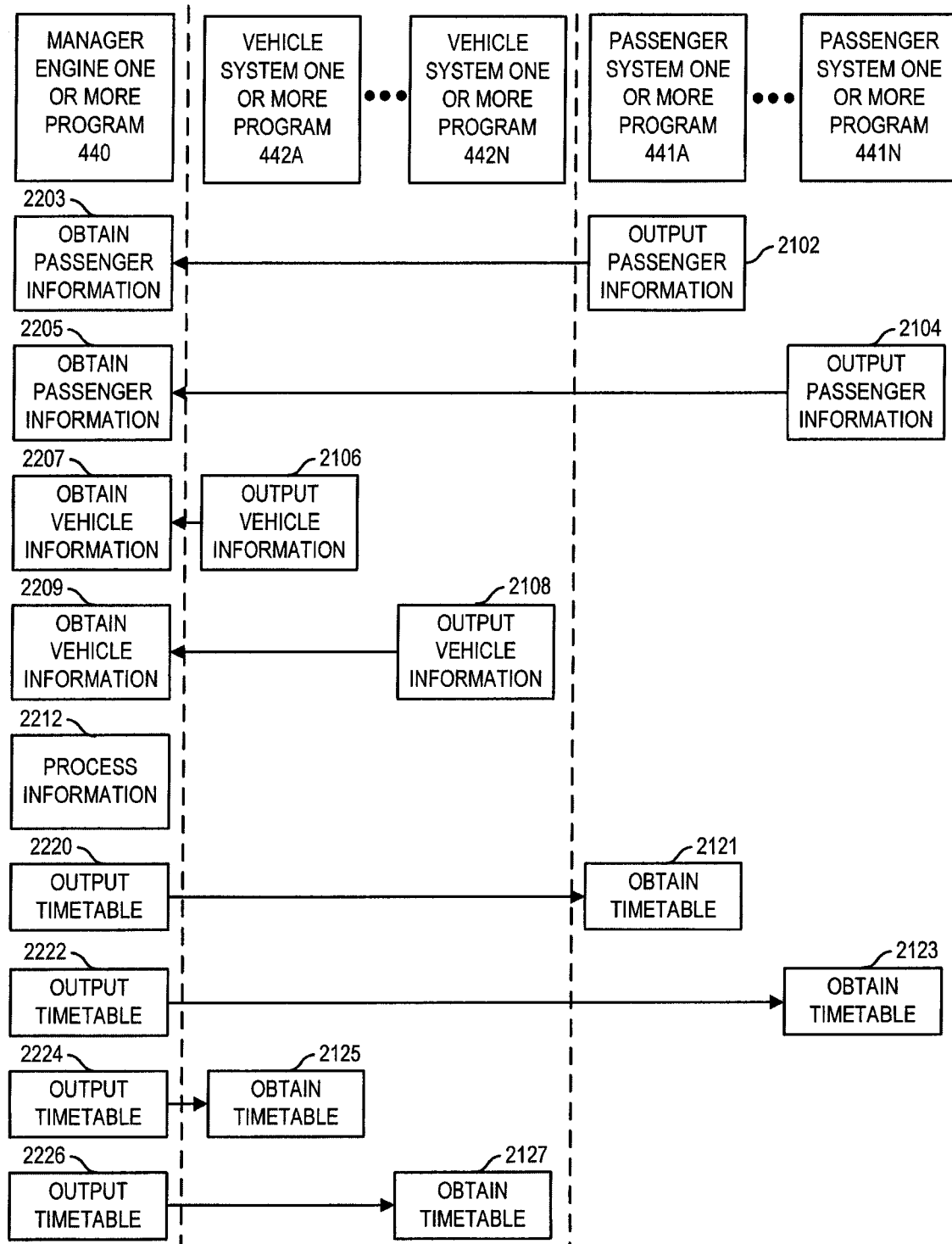
FIG. 21 is a flow diagram illustrating a method in accordance with an embodiment as set forth herein.

FIG. 21 is a diagram illustrating further aspects of a process for providing an output of transportation network. By way of explanation, in FIG. 21, processes are illustrated from the point of view of a manager engine one or more program 440 (e.g., running on manager engine 410 of FIG. 4), passenger system one or more program 441A-441N and vehicle system one or more program 442A-442N.

In one embodiment, some or all of the one or more program 440, 441A-441N, 442A-442N may run on a different collection of physical or virtual machines or processors, depending on the need for scalability of the system. In one embodiment, each of the one or more program 440, 441A-441N, 442A-442N can run on a different computer node. In one specific example, each of the one or more program 440, 441A-441N, 442A-442N can run on a single multi-processor server system. In another specific example, various portions of manager engine one or more program 440 may run on different processors running on different computing nodes. In one embodiment, each one or more passenger system one or more program, 441A-441N can run on a different passenger system computing node 100 of passenger system 406, each provided by a mobile device. In one embodiment, each one or more passenger system one or more program, 441A-441N can run on a different vehicle system computing node 100 of vehicle system 414, e.g., each provided within a different vehicle of transportation network.

By way of overview, FIG. 21 illustrates, at least in part, one or more embodiments in which an output can be provided in a transportation network.

In one embodiment, at blocks 2102-2104 passenger system one or more programs 441A-441N can output passenger information by transmitting the passenger information to one or more program 440. Passenger information can include e.g. passenger trajectories, and/or timestamped passenger locations and/or other passenger information set forth herein. At blocks 2203-2205 one or program 440 can obtain the output passenger information.

In one embodiment at blocks 2106-2108 vehicle system one or more program 442A-442N can output vehicle information. Vehicle system information can include e.g., vehicle location information and/or other vehicle information as set forth herein. At blocks 2207-2209 one or program 440 can obtain the output vehicle information.

In one embodiment at block 2212 one or more program 440 can process the obtained information obtained at blocks 2203-2205 and/or at 2207-2209. In one embodiment at block 2212 one or more program 440 can determine a timetable based on a processing of one or more of passenger information or vehicle information. For determining a timetable at block 2212 one or more program 440 can determine a passenger flow matrix for one or more station as set forth herein. For determining a timetable at block 2212 one or more program 440 can determine one or more wait time as set forth herein.

In one embodiment, at blocks 2220-2222 one or more program 440 can output a timetable to respective passenger system one or more programs 441A-441N. At blocks 2121-2123 one or more programs 441A-441N can obtain the output timetable.

In one embodiment, at blocks 2224-2226 one or more program 440 can output a timetable to respective vehicle system one or more programs 442A-442N. At blocks 2125-2127 one or more programs 442A-442N can obtain the output timetable. Referring to the flow diagram of FIG. 21, blocks 2203 and 2205 shown as being performed by one or more program 440 can represent an example of performance of block 510 (FIG. 5) in one embodiment. Referring to the flow diagram of FIG. 21, blocks 2212, 2220, 2222, 2224 and 2226 shown as being performed by one or more program 440 can represent an example of performance of block 520 (FIG. 5) in one embodiment.

In baseline timetables and adapted timetables set forth herein timing parameters can be provided in the form of vehicle departure times. It will be understood that in alternative embodiments, timing parameters can in addition or in the alternative be provided by, e.g., vehicle arrival times, and/or vehicle speed (distance/time). In one embodiment a processing of a flow matrix herein can assume a constant vehicle speed. In one embodiment a processing of a flow matrix herein can assume a variable vehicle speed.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" encompass relationships where an element is partially based on as well as relationships where an element is entirely based on. Forms of the term "defined by" encompass relationships where an element is partially defined by as well as relationships where an element is entirely defined by. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
   obtaining, by one or more processor, passenger information of one or more passenger,
   wherein the passenger information includes passenger location information; and
   providing, by the one or more processor, an output based on a processing of the passenger information, wherein the processing includes:
   determining one or more flow matrix;
   determining a cumulative wait time, using the one or more flow matrix; and
   determining an adapted timetable using the cumulative wait time, the adapted timetable having one or more adjusted vehicle timing; and
   outputting the output, wherein the output includes the adapted timetable,
   wherein the output is an output to adjust a timing of one or more vehicle of a transportation network.

2. The method of claim 1, wherein the processing of the passenger information includes determining alternative trajectories based on the cumulative wait time.

3. The method of claim 1, wherein the determining the cumulative wait time includes determining cumulative wait time of passengers through one or more interchange station of the transportation network.

4. The method of claim 1, wherein the method includes transmitting the output to a machine vehicle operator.

5. The method of claim 1, wherein the adapted timetable of the output specifies one or more of the following selected from the group consisting of (a) adjusted vehicle departure times and (b) adjusted vehicle speeds.

6. The method of claim 1, wherein outputting the output includes specifying a delayed departure time for one or more vehicle of the transportation network to reduce a cumulative wait time for passengers of the transportation network.

7. The method of claim 1, wherein the adapted timetable specifies a schedule of departures of vehicles of the transportation network, and wherein the method includes presenting the adapted timetable to vehicle operators and passengers of the transportation network.

8. The method of claim 1, wherein the adapted timetable specifies a schedule of departures of vehicles of the transportation network, wherein the method includes transmitting the adapted timetable to computing nodes of vehicle operators and wherein the method includes transmitting the adapted timetable to computing nodes of vehicle operators of the transportation network.

9. The method of claim 1, wherein the output includes information recommending a change to a passenger trajectory, and wherein the output is transmitted to a computing node of a passenger.

10. The method of claim 1, wherein the method includes tracking a route of a certain passenger through the transportation network during a trip of the certain passenger, and based on the determining the cumulative wait time, transmitting, during the trip, to a passenger computing node of the certain passenger a recommendation to change the certain passenger's route through the transportation network.

11. The method of claim 1, wherein the output is transmitted to a computing node of a vehicle operator of the transportation network.

12. The method of claim 1, wherein the passenger trajectory information includes passenger trajectory information of a plurality of passengers and wherein the passenger information includes passenger position information.

13. The method of claim 1, wherein the processing includes processing to determine the adapted timetable for providing a reduced cumulative wait time.

14. The method of claim 1, wherein the output is based on a processing of vehicle information.

15. A computer program product comprising:
   a computer readable storage device readable by one or more processing circuit and storing instructions for execution by one or more processor for performing a method comprising:
   obtaining, by one or more processor, passenger information of one or more passenger, wherein the passenger information includes passenger trajectory information; and
   providing, by the one or more processor, an output based on a processing of the passenger information, wherein the processing includes:

determining one or more flow matrix;
determining a cumulative wait time using the one or more flow matrix;
determining an adapted timetable using the cumulative wait time, the adapted timetable having one or more adjusted vehicle timing; and
outputting the output, wherein the output includes the adapted timetable,
wherein the output is an output to adjust a timing of one or more vehicle of a transportation network.

16. A system comprising:
a memory;
one or more processor in communication with the memory; and
program instructions executable by the one or more processor via the memory to perform a method, the method comprising:
obtaining, by one or more processor, passenger information of one or more passenger, wherein the passenger information includes passenger trajectory information; and
providing, by the one or more processor, an output based on a processing of the passenger information, wherein the processing includes:
determining one or more flow matrix;
determining a cumulative wait time using the one or more flow matrix;
determining an adapted timetable using the cumulative wait time, the adapted timetable having one or more adjusted vehicle timing; and
outputting the output, wherein the output includes the adapted timetable,
wherein the output is an output to adjust a timing of one or more vehicle of a transportation network.

17. The system of claim 16, wherein the providing an output includes specifying a delayed departure time for one or more vehicle of the transportation network to reduce a cumulative wait time for passengers of the transportation network.

18. The system of claim 16, wherein the adapted timetable specifies a schedule of departures of vehicles of the transportation network, wherein the method includes transmitting the adapted timetable to computing nodes of vehicle operators and wherein the method includes transmitting the adapted timetable to computing nodes of vehicle operators of the transportation network.

19. The system of claim 16, wherein the method includes tracking a certain passenger's route through the transportation network during a trip of the certain passenger, and based on the determining the cumulative wait time, transmitting during the trip to a passenger computing node of the certain passenger a recommendation to change the certain passenger's route through the transportation network.

* * * * *